R. SHAFFER.
LIQUID FERTILIZER DISTRIBUTER.
APPLICATION FILED AUG. 14, 1916.
1,245,626.
Patented Nov. 6, 1917.
2 SHEETS—SHEET 2.
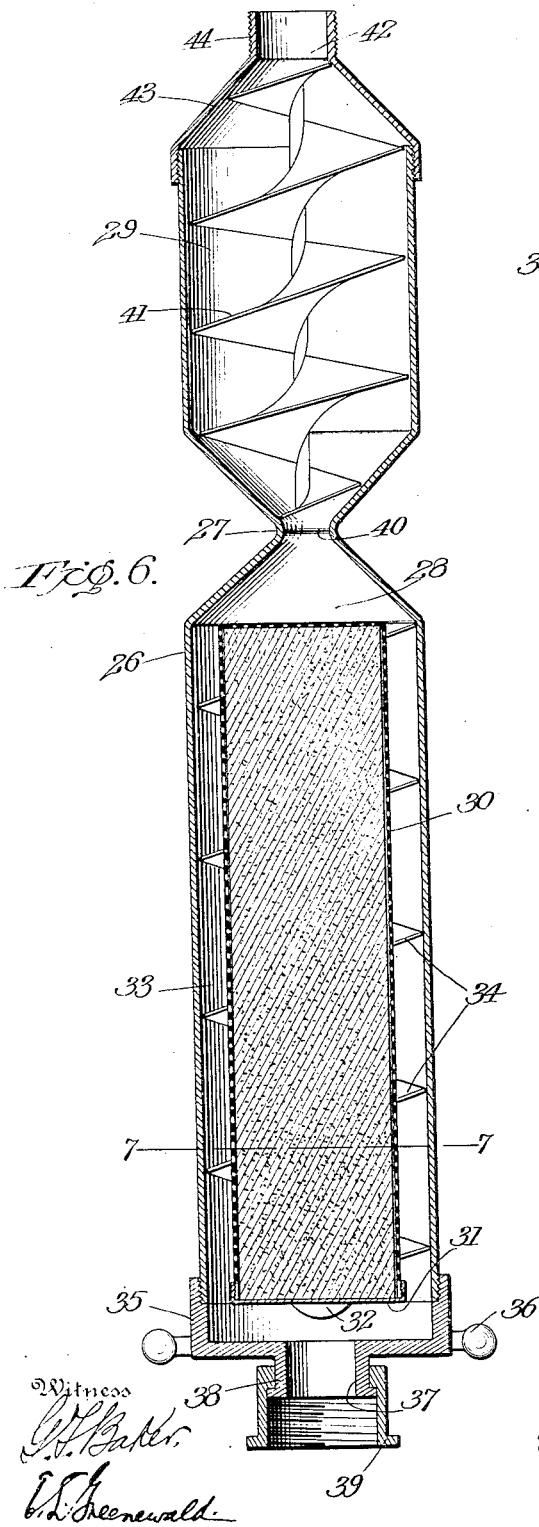
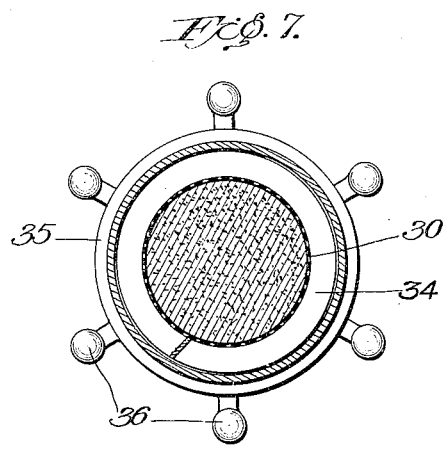
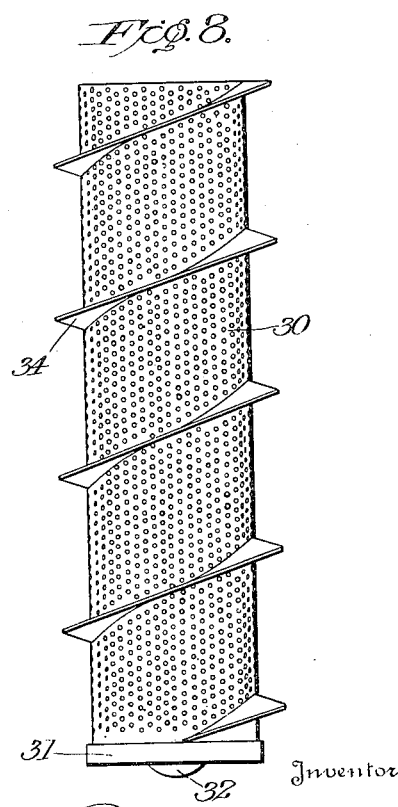

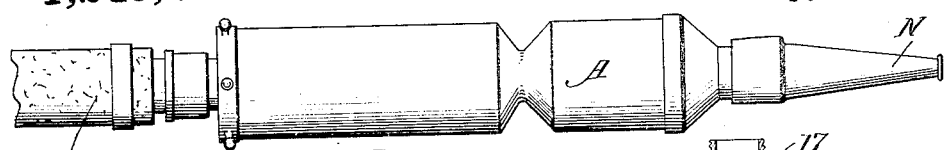
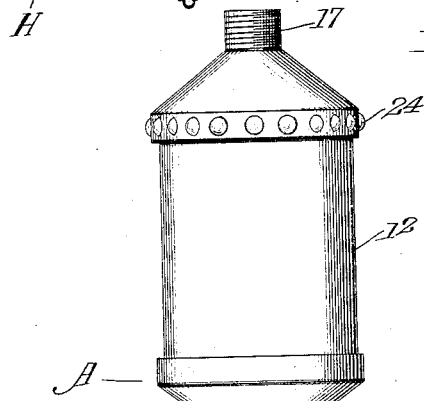
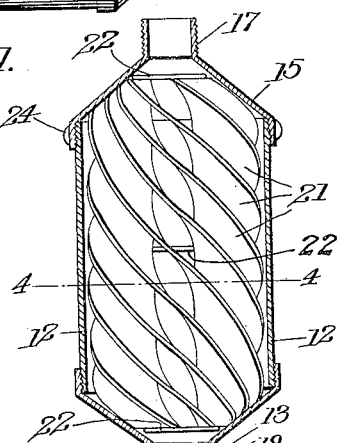
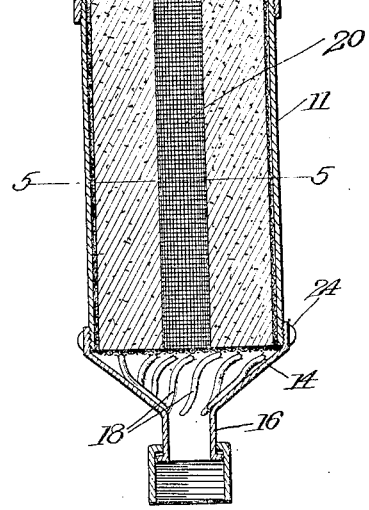
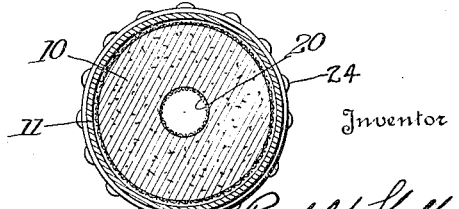
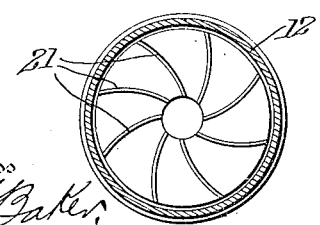

UNITED STATES PATENT OFFICE.

RANDOLPH SHAFFER, OF TAMPA, FLORIDA.

LIQUID-FERTILIZER DISTRIBUTER.

1,245,626.  Specification of Letters Patent.  Patented Nov. 6, 1917.

Application filed August 14, 1916. Serial No. 114,843.

*To all whom it may concern:*

Be it known that I, RANDOLPH SHAFFER, a citizen of the United States, residing at Tampa, Hillsborough county, State of Florida, have invented certain new and useful Improvements in Liquid-Fertilizer Distributers, of which the following is a specification.

This invention relates to attachments for garden sprinklers or sprinkling systems and has for its object to provide a device which may be readily attached to a sprinkling system or to an ordinary garden hose and which causes the water passing through the hose or sprinkling system to become impregnated with a chemical which may be either a fertilizer, calculated to nourish the plants sprinkled, or which may be a poison, capable of killing bugs and insects with which it comes in contact.

My invention contemplates the use of a quantity of fertilizer or poisonous substance securely held within a casing through which the water passes, flowing by the soluble material so that the issuing stream is a solution of the fertilizing or poisoning substance. My invention also contemplates means whereby the stream of water passing from the receptacle containing the soluble material is thoroughly broken up and its portions commingled so that all parts of the issuing solution are of equal strength.

The invention will be fully disclosed in the following description taken in connection with the accompanying drawings, in which, Figure 1 is a view illustrating the invention in use;

Fig. 2 is a side elevation of one form of the invention;

Fig. 3 is a longitudinal section of the same;

Fig. 4 is a section along the line 4—4 of Fig. 3;

Fig. 5 is a section along the line 5—5 of Fig. 3;

Fig. 6 is a central longitudinal section of another form of poison or fertilizer distributer embodying the invention;

Fig. 7 is a transverse section taken on the line 7—7, and

Fig. 8 is a side elevation of the container for fertilizer or poison used in the device shown in Fig. 6.

In the form of the invention disclosed in Figs. 2 to 5 of the drawings, a soluble cake of fertilizing or poisoning material 10 is shown contained within a metal casing A, which comprises cylindrical end portions 11 and 12 connected by a neck 13. The end portion 11 of the casing contains therein the soluble cake 10 while the other end of the casing incloses the mixing chamber. Although the casing is shown as being composed of separate units screw-threaded together, it may be made in one piece, if desired. To the outer ends of the cylinders 11 and 12 are detachably secured, as by screw-threading, the end portions or caps 14 and 15, respectively, which are adapted to be readily removed and replaced in charging and cleaning the device.

The cap portion 14 has a neck 16 having thereon a threaded sleeve which forms a part of the usual standard coupling whereby the device may be readily attached to a length of hose or to any pipe or spigot of the correct diameter, and the cap portion 15 is provided with a neck 17 having screw-threads thereon adapted to receive the sleeve of a standard coupling. On the inner side of the cap 14 and preferably integral therewith are spiral guide vanes 18, which are designed to give the stream of water entering through the neck 16 a whirling motion as it comes into contact with the soluble cake 10. The portion of the neck 13 which faces the inlet through the neck 16 is also provided with integral guide vanes 19 which are adapted to impart a whirling motion to the water as it leaves the cylinder 11 and is about to pass through the opening in the neck 13 into the mixing chamber.

The soluble cake 10, which is annular in form, is supported within a perforated container of wire or sheet metal, preferably by a wire screen 20 comprising upper and lower annular disks connected by concentric tubular members. The wire screen serves as a cage for the cake and prevents it from becoming displaced when it becomes reduced in size or when it is broken.

Contained within the mixing chamber are a series of spiral sheet metal guide vanes 21 secured together in fixed relation by three wire rings 22. The vanes are arranged so as to leave a central opening longitudinally therethrough, as shown in Fig. 4, and are spaced from the side of the cylindrical casing, being held in such position and prevented from rotation due to the energy of the water passing through the mixing chamber by the clamping action of the cap 15, which is screwed down into contact with the upper ends of the vanes. The caps 14 and 15 are each provided with a series of projecting knobs 24 which serve as hand grips in removing and replacing the caps.

In the operation of the device, it may be attached, for instance, between two sections of hose, one of which is connected to a source of water supply and the other to a distributing device such as a nozzle or sprinkler. The use of the device is illustrated in Fig. 1 where a hose H is coupled to the inlet end of the casing A and a nozzle N is connected directly to the outlet end of the casing. Upon the water being turned on it enters the device through the neck 16, and after acquiring a whirling motion due to the vanes 18, it comes in contact with the soluble cake of fertilizer or insect poison 10 and passes outwardly through the central opening or around the outer edges of the cake, dissolving in its passage a proportion of the cake which may be predetermined by properly regulating its solubility. As it is about to leave the cylinder 11 it encounters the spiral vanes 19, which also tend to give it a whirling motion and it then passes through the opening in the neck 13 into the mixing chamber. Here it encounters the spiral vanes 21 which thoroughly mix the solution so that when it finally passes out through the neck 17 the solution is perfectly uniform.

The distributer shown in Fig. 6 consists of an elongated tubular metal casing 26 provided with a neck 27 intermediate its ends to form two compartments, a compartment 28 for the fertilizer or for the poisonous material and a compartment 29 for mixing the solution. The compartment 28 has within it a metal container 30 made either of perforated metal or wire mesh, the one shown in the present device being made of perforated metal. The container 30 is adapted to hold a quantity of soluble fertilizing material or soluble poisonous compound and is cylindrical in shape having an imperforate screw cap 31 fitted to the lower end thereof. The cap 31 has a grip 32 whereby it may be unscrewed. The container 30 is of smaller diameter than the casing so as to leave a space 33 between the two for the passage of water around the container. Spiral vanes 34 are located in the annular space 33 so as to impart a whirling motion to the water passing through the chamber 28 and also to increase the time of contact of the water with the soluble material in the container 30. The spiral vanes are made of sheet metal and may be independent of both the container and the casing or may be attached to either one. In the present form I have shown it attached to the container 30 to position the latter concentrically in the casing.

A screw threaded head 35 closes the lower end of the casing 26 and is provided with arms or projections 36 which serve as a grip for turning the head. The head 35 has a central passage 37 therein formed in a boss 38 which carries the usual hose coupling 39 by means of which the distributer may be attached to a hose or other pipe.

The mixing chamber 29 receives the solution from the chamber 28 after the solution flows through the passage 40 in the neck 27. The chamber 29 contains a spiral screw or vane 41 made of sheet metal which fits tightly in the mixing chamber and causes the water to travel in a circular direction and thoroughly mixes the soluble material with the water before the solution leaves the distributer at the opening 42 in the cap 43. The cap 43 is screw-threaded to fit the end of the casing and holds the mixing means 41 in place and also has an annular exteriorly threaded nipple 44 to which a hose or nozzle may be attached.

In order to charge the device shown in Fig. 5, the head 35 is removed and the cap 31 may then be removed without withdrawing the container 30 from the casing. The chemical is then charged into the container 30 and the cap 31 and head 35 are replaced. The device may then be attached to a hose to feed water through the device.

The devices may be made of any desired size or dimensions for all purposes in connection with fertilizing and with insect poisoning. Their portability renders them especially desirable in lawn sprinkling and in sprinkling small gardens. The solution renders the fertilizer contained therein available for plant life at once and furthermore they are especially adapted to the uses of persons unfamiliar with the theory and practice of fertilizing, who simply insert the proper soluble cake as directed and turn on the water. No pressure tank is necessary, such as required by the great majority of such sprayers, but the pressure from the faucets of city water supplies or from elevated tanks is ample for the dissolving and spraying.

Having described the invention, what is claimed and desired to be secured by Letters Patent is:

1. In a device for producing solutions of the kind described, the combination of an elongated casing provided with an inlet and an outlet and also having a neck intermediate its ends dividing the casing into two chambers, a perforated device in one of said chambers opposite the inlet of the casing for holding a quantity of soluble material, and means in the other chamber for mixing the solution before it reaches the outlet.

2. In a device for producing solutions, the combination of a casing having an inlet adjacent one end and an outlet adjacent the other end, said casing having two connected compartments, a perforate container in one of the compartments for holding a quantity of soluble poisonous or fertilizing material, vanes for imparting a whirl to the water as it passes through the compartment holding said container, and spiral vanes in the other of said compartments for mixing the solution of said material before it reaches said outlet.

3. In a device for producing solutions, the combination of a casing having an inlet and an outlet, a perforate container in said casing for holding soluble material, and a spiral vane between the inner wall of said casing and the outer wall of said container forming a spiral fluid passage around the sides of said container.

4. A device of the class described comprising a casing having cylindrical end portions connected by a narrow passage and having inlet and outlet openings in the ends, means in one of said end portions to contain a quantity of soluble material, and means in the other of said end portions for mixing a current of fluid passing therethrough.

5. A device of the class described comprising a casing having cylindrical end portions connected by a narrow neck and having inlet and outlet openings in the ends, a perforated container within one of said end portions adapted to contain soluble material, and a vane within the other of said end portions, said vane being adapted to mix thoroughly a fluid passing therethrough.

6. In a device for producing poisoning or fertilizing solutions, the combination of an elongated casing having an inlet at one end and an outlet at the other end, said casing having two axially alined connected compartments, a perforate member in one of said compartments for holding a quantity of soluble poisonous or fertilizing material, a spiral vane in the other compartment for mixing a solution of said material, and means at the inlet end of the casing for coupling it to a fluid supply pipe.

7. In a device for producing poisoning or fertilizing solutions, the combination of an elongated substantially tubular casing having removable ends and contracted intermediate its ends to form a neck and provide two axially alined connected compartments in said casing, said casing having an inlet leading into the first compartment and an outlet leading from the second compartment, a perforate member in the first compartment for holding a quantity of soluble poisonous or fertilizing material, said first compartment having a water passage extending longitudinally therethrough to permit water to contact with and dissolve said soluble material, mixing means in the second compartment for thoroughly mixing the solution received from the first compartment, means at the inlet end of the casing for coupling it to a water supply pipe, and means at the outlet end whereby the casing may be attached to a suitable distributing device.

8. In a device for producing solutions, the combination of a casing having an inlet and an outlet, a perforate container in said casing having a filling opening in one end thereof opposite the inlet of the casing, a cap for the filling opening of said container, said cap being removable from and replaceable on said container without removing the container from the casing, and a spiral vane between the inner wall of said casing and the outer side of said container forming a spiral fluid passage around the outside of said container.

9. A distributer of the class described comprising an elongated substantially tubular casing having two compartments, a container for soluble material in one of said compartments, spiral vanes surrounding said container, a cap for said casing, a cap for said container removable therefrom without removing the container, and mixing means in the other compartment of the casing.

10. In a device for producing solutions, the combination of a casing having an outlet, a detachable cover for said casing having a hollow neck constituting the inlet passage of the casing, a swivel coupling on the outer end of said neck, a perforate container in said casing having a filling opening in one end thereof opposite said detachable cover and inlet passage, a cap for the filling opening of said container, said cap being removable from and replaceable on said container without removing the container from the casing, and means in the casing for whirling the water as it passes through said casing.

In testimony whereof I affix my signature.

RANDOLPH SHAFFER.